United States Patent
Campbell et al.

(10) Patent No.: US 7,243,923 B2
(45) Date of Patent: Jul. 17, 2007

(54) CENTERING DRILL CHUCK

(75) Inventors: David C. Campbell, Bel Air, MD (US); Louis A. Gibbons, Stevensville, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/055,362

(22) Filed: Feb. 9, 2005

(65) Prior Publication Data

US 2006/0175768 A1  Aug. 10, 2006

(51) Int. Cl.
*B23B 31/12* (2006.01)
*B23B 31/08* (2006.01)

(52) U.S. Cl. ............... 279/133; 279/137; 279/156

(58) Field of Classification Search ........... 279/133, 279/137, 139, 156, 60, 61, 62, 123, 152
See application file for complete search history.

(56) References Cited

U.S. PATENT DOCUMENTS

| | | | |
|---|---|---|---|
| 948,850 A | 2/1910 | Fegley | |
| 1,369,632 A | 2/1921 | Diel | |
| 1,510,896 A | 10/1924 | McConnell | |
| 2,315,524 A * | 4/1943 | Hubbell | 279/62 |
| 2,387,339 A * | 10/1945 | Meyer | 279/61 |
| 2,466,129 A | 4/1949 | Stoner | |
| 2,484,027 A * | 10/1949 | Haffey | 279/16 |
| 2,777,703 A | 1/1957 | Pickett et al. | |
| 3,553,753 A * | 1/1971 | Hundley | 470/96 |
| 3,582,097 A | 6/1971 | Elliott, Jr. | |
| 4,094,523 A | 6/1978 | Derbyshire | |
| 4,305,597 A | 12/1981 | McCarty | |
| 4,385,854 A * | 5/1983 | Miyakawa | 408/127 |
| 4,536,113 A | 8/1985 | Hatfield | |
| 4,627,626 A * | 12/1986 | Rohm | 279/145 |
| 4,664,394 A * | 5/1987 | Theissig et al. | 277/641 |
| 4,695,066 A * | 9/1987 | Rohm | 279/62 |
| 4,700,956 A * | 10/1987 | Rohm | 279/19.4 |
| 5,029,881 A | 7/1991 | Godfrey | |
| 5,031,925 A | 7/1991 | Tatsu et al. | |
| 5,125,673 A | 6/1992 | Huff et al. | |
| 5,135,241 A * | 8/1992 | Huff et al. | 279/142 |
| 5,215,317 A | 6/1993 | Jordan et al. | |
| 5,299,814 A * | 4/1994 | Salpaka | 279/157 |
| 5,409,243 A * | 4/1995 | Shadeck et al. | 279/157 |
| 5,465,983 A * | 11/1995 | Owens et al. | 279/157 |
| 5,540,453 A * | 7/1996 | Sakamaki | 279/60 |
| 5,918,886 A | 7/1999 | Horiuchi et al. | |
| 6,129,363 A | 10/2000 | Mack et al. | |
| 6,135,462 A * | 10/2000 | Robison | 279/137 |
| 6,193,242 B1 * | 2/2001 | Robison | 279/137 |
| 6,241,026 B1 * | 6/2001 | Wache et al. | 173/132 |

(Continued)

FOREIGN PATENT DOCUMENTS

DE  1001085  6/1957

(Continued)

*Primary Examiner*—Monica Carter
*Assistant Examiner*—Michael W. Talbot
(74) *Attorney, Agent, or Firm*—Harness, Dickey & Pierce, P.L.C.

(57) ABSTRACT

A drill includes a chuck which has a body member including a bore to receive a tool. Jaw members frictionally engage the tool to retain the tool in the chuck. A member is associated with the jaw members and the body to move the jaw members between clamping and non-clamping position. A centering mechanism extends radially into the body member to center tool bits within the chuck while prohibiting the tool bit from contacting the bore wall.

15 Claims, 3 Drawing Sheets

U.S. PATENT DOCUMENTS

| | | |
|---|---|---|
| 6,354,605 B1 | 3/2002 | Aultman |
| 6,520,508 B1 * | 2/2003 | Jordan ........................ 279/46.7 |
| 6,554,292 B1 * | 4/2003 | Rohm ......................... 279/137 |
| 2002/0067008 A1 | 6/2002 | Frenzel et al. |
| 2003/0026670 A1 * | 2/2003 | Temple-Wilson ........... 408/240 |

FOREIGN PATENT DOCUMENTS

| | | |
|---|---|---|
| DE | 30 03 703 | 8/1980 |
| DE | 77 34 441 | 9/1981 |
| DE | 22 12 000 C2 | 1/1985 |
| DE | 34 43 138 C2 | 8/1987 |
| DE | 33 38 422 C1 | 12/1992 |
| DE | 35 40 223 C2 | 2/1993 |
| DE | 100 57 977 A2 | 6/2002 |
| EP | 561247 A1 * | 9/1993 |
| EP | 0 530 431 B1 | 3/1996 |
| EP | 0 674 960 | 4/1998 |
| EP | 0 768 930 B1 | 11/2002 |
| FR | 2617071 A1 * | 12/1988 |
| GB | 621761 | 4/1949 |
| WO | WO 96/01165 | 1/1996 |

* cited by examiner

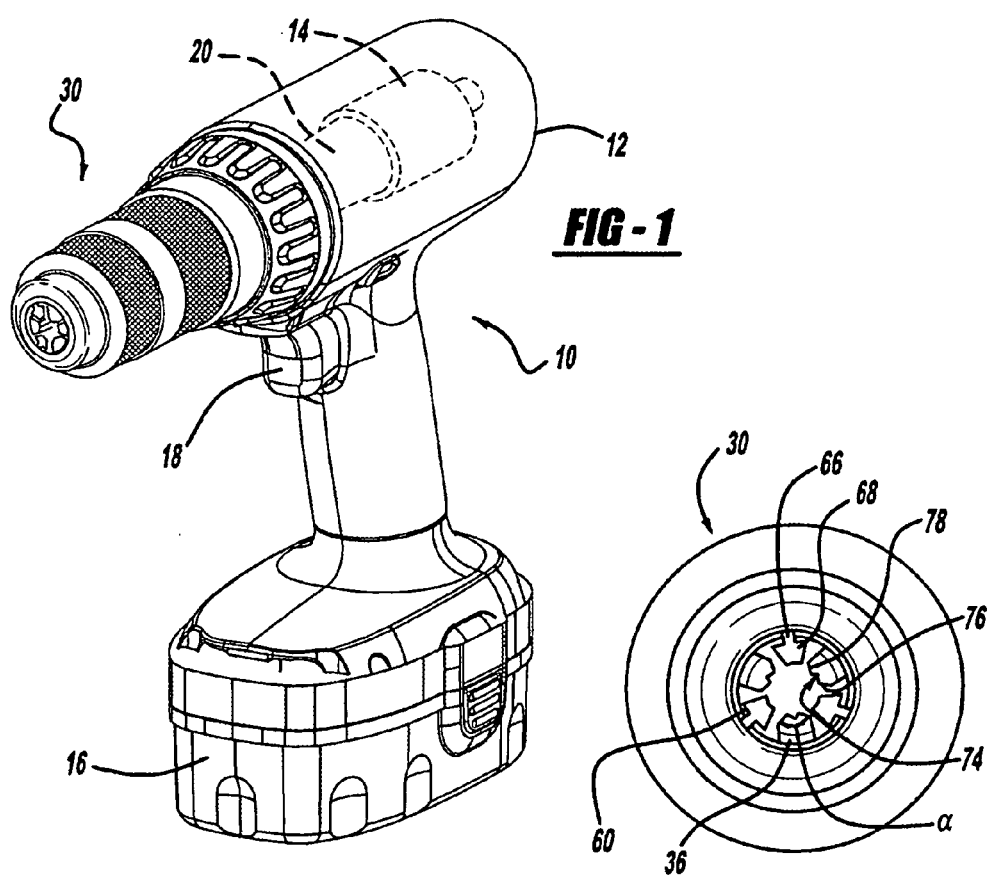
FIG-1
FIG-2a
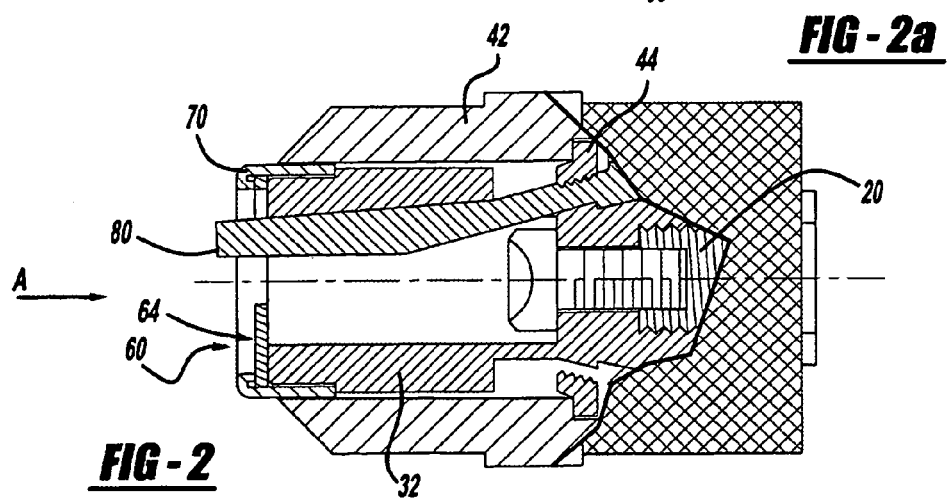
FIG-2

CENTERING DRILL CHUCK

FIELD OF THE INVENTION

The present invention relates to drill chucks and, more particularly, to drill chucks having a device to self center tools or bits in the chuck.

BACKGROUND AND SUMMARY OF THE INVENTION

Anyone, albeit a skilled tradesman, an avid handyman, or a novice weekend tool man, when trying to tighten a small bit or tool into a drill chuck must hold the bit or tool with one hand while tightening the chuck. With larger diameter bits or tools, it is easier to place the tool into the chuck and tighten it since the jaws contact the tool or bit balancing it in the chuck. However, when tightening tools that have a diameter less than a quarter inch, often times the tool gets caught between adjacent jaws during tightening. Thus, the chuck must be reversed, the tool removed from between adjacent jaws and then centered in the chuck and further tightened. Two methods to deal with this problem are: (1) holding the tool with one hand while tightening the jaws to clamp around the tool; or (2) attempting to close the jaws to an approximate size so that the tool will not be caught between the jaws and further tightening the chuck. Thus, it is desirable to have a centering device which enables the tradesman to tighten the chuck without holding the tool in place.

The present invention provides the art with a chuck which includes a device to center tool bits within the chuck and enable tightening of the chuck around the tool. The present invention provides a mechanism between adjacent jaws which exerts a force to center tool bits within the chuck. The present invention is resilient enough to deflect, when larger diameter tools are inserted into the chuck, and rigid enough so that, when smaller diameter tools are inserted into the chuck, it centers the tool within the chuck. Also, the invention includes jaws that have tool contacting surfaces which are angled at about 135° with respect to one another. This enables adjacent jaws to guide small diameter tools from the periphery of the chuck bore towards the center of the bore to converge the tools between the jaws.

In accordance with the present invention, a chuck for a drill comprises a body member having a wall defining a bore to receive a tool to be retained within the chuck. Jaw members are received in the body member. The jaw members frictionally engage the tool to retain it in the chuck. A mechanism to open and close the jaw members is associated with the jaw members and the body to move the jaw members between a clamping and a non-clamping position. A centering mechanism extends radially into the body member bore. The centering mechanism prohibits tools from contacting the body member wall and enables the jaw members to contact and clamp the tool. The centering mechanism is positioned between adjacent jaw members. The centering mechanism includes a plurality of projecting members, each projecting member is positioned between an adjacent jaw member. The centering mechanism is manufactured from a resilient material that enables the mechanism to bend into the bore and to return to its original position. The projecting members generally include a neck secured to the body member near the wall and a head adjacent the jaw members. Also, the projecting member could include an adhesive strip secured to the wall with a plurality of hook or loop type members on each strip. Each jaw has a pair of tool contacting faces. The faces abut one another and form at an obtuse angle with a measurement of about 135°. A spacer may be positioned in the bore. The spacer may have at least one rib to center the tool when the tool contacts the spacer.

According to a second aspect of the invention, a power tool comprises a housing with a motor inside the housing. An output is coupled with the motor. The power tool includes a power source and an actuation member coupled with the power source and the motor to activate the motor to drive the output. A chuck is coupled with the output. The chuck comprises a body member having a wall defining a bore to receive a tool to be retained within the chuck. Jaw members are received in the body member. The jaw members frictionally engage the tool to retain it in the chuck. A mechanism to open and close the jaw members is associated with the jaw members and the body to move the jaw members between a clamping and a non-clamping position. A centering mechanism extends radially into the body member bore. The centering mechanism prohibits tools from contacting the body member wall and enables the jaw members to contact and clamp the tool. The centering mechanism is positioned between adjacent jaw members. The centering mechanism includes a plurality of projecting members, each projecting member is positioned between an adjacent jaw member. The centering mechanism is manufactured from a resilient material enabling the mechanism to bend into the bore and to return to its original position. The projecting members generally include a neck secured to the body member near the wall and a head adjacent the jaw members. Alternatively, the projecting member could include an adhesive strip secured to the wall with a plurality of hook or loop type members on each strip. Each jaw has a pair of tool contacting faces. The faces abut one another to form at an obtuse angle with a measurement of about 135°. A spacer may be positioned in the bore. The spacer may have at least one rib to center the tool when the tool contacts the spacer.

According to a third aspect of the invention, a chuck comprises a body member having a wall which defines a bore to receive a tool to be retained within the chuck. Jaw members are received in the body member. The jaw members frictionally engage the tool to retain the tool within the chuck. A mechanism to open and close the jaw members is associated with the jaw member and the body member to move the jaw members between a clamping and a non-clamping position. The chuck includes a plurality of centering members. Each centering member is positioned between an adjacent jaw members creating a jaw member, centering member, repeating pattern. Each centering member is made of a material rigid enough to support small tools from deflecting the centering member so that the centering members enable the jaw members to clamp the small tools without the small tools becoming wedged between adjacent jaw members. Also, the centering members are resilient enough to easily deflect when large tools are positioned in the bore which have a diameter larger than the diameter defined between the ends of the plurality of the centering members. The plurality of centering members each have a neck and a head such that the heads extend towards one another. The plurality of centering members are manufactured from Mylar, Nitinol, spring steel or the like.

From the following detailed description taken in conjunction with the drawings and subjoined claims, other objects and advantages of the present invention will become apparent to those skilled in the art.

BRIEF DESCRIPTION OF THE DRAWINGS

FIG. 1 is a perspective view of a drill including a chuck in accordance with the present invention.

FIG. 2 is a partial cross-sectional view of the chuck in accordance with the present invention.

FIG. 2A is a plan view in the direction of arrow A of FIG. 2.

DETAILED DESCRIPTION OF THE PREFERRED EMBODIMENTS

Figure 3:
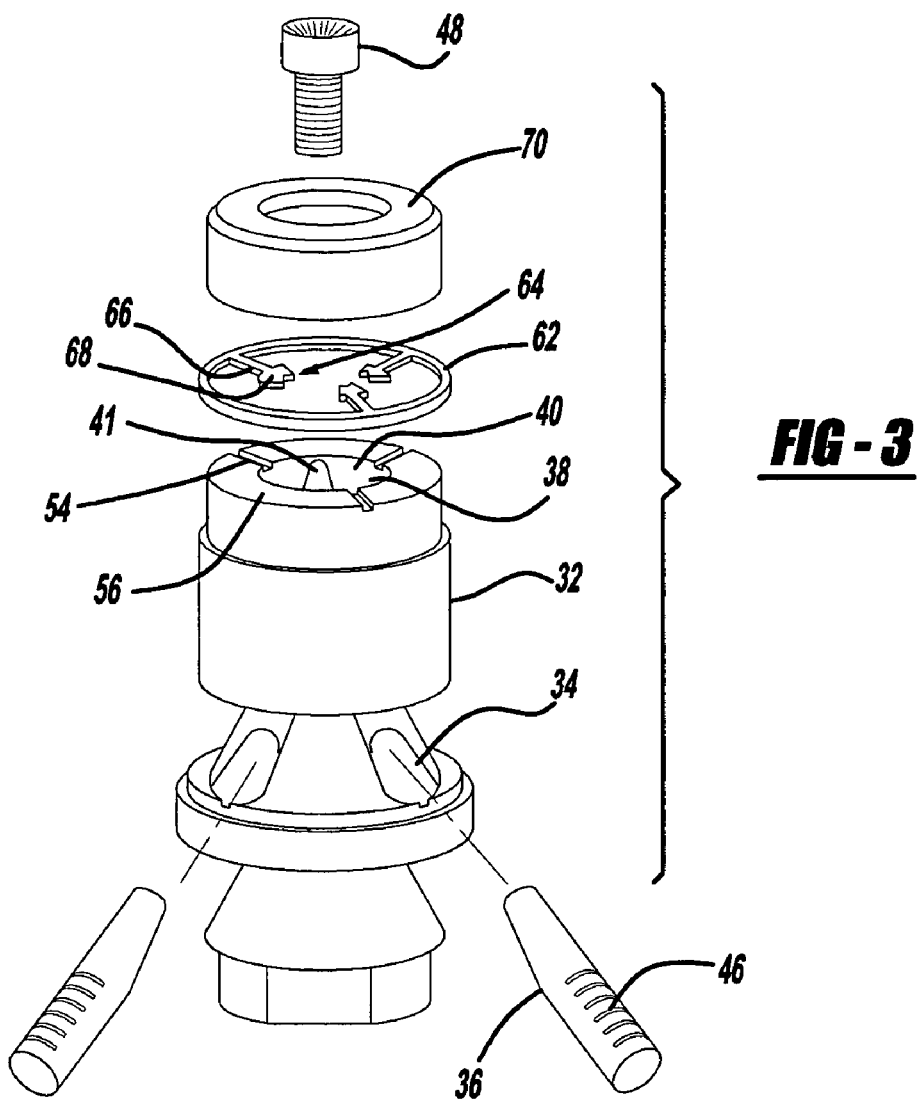
FIG. 3 is an exploded perspective view of the inner chuck components in accordance with the present invention.

Turning to the figures, particularly FIG. 1, a drill is illustrated and designated with the reference numeral 10. The drill includes a housing 12, usually of the clam shell type. A motor 14 is positioned inside the housing 12 and is electrically coupled with a power source 16 via an activating mechanism 18. The activating mechanism 18 is a trigger switch which is electrically connected with the power source 16 to energize and de-energizing the motor 14 which, in turn, drives the output 20. The output 20 is coupled with a drill chuck 30. The drill chuck 30 receives tools such as bits, drivers or the like.

Turning to FIGS. 2 through 3, the chuck 30 is better illustrated. The chuck 30 includes a body member 32 which includes bores 34 to receive jaw members 36. The jaw members 36 are positioned in bores 34 of the body 32. The jaw members 36 extend into a central bore 38 which is defined by a circumferential wall 40. A collar 42 is positioned around the body 32. The collar 42 includes a threaded portion 44 which couples with a threaded portion 46 of the jaw members 36. As the collar 42 is rotated, the jaw members 36 move in and out of the central bore 38 between clamping and non-clamping positions. Also, a chuck screw 48 is present to secure the chuck 30 onto the output 20.

Jaw guide surfaces are formed at the end of the chuck body 32. The jaw guide surfaces guide the jaw members 36 in the bore 34 to clamp a tool. Thus, the jaw members 36 are directed toward an apex as they come together to clamp the tool.

A centering mechanism 60 is positioned on the chuck body 32. The centering mechanism 60 may include a base 62 with projecting members 64. The projecting members 64 include a neck 66 and a head 68. The necks 66 may be received in slots 54 on the end surface 56 of the chuck body 32. Alternatively, the projecting members 64 are staked into the slots 54 on the end surface 56 eliminating the base 62. This provides a retention mechanism for the neck. The head 68 projects into the bore 38 between adjacent jaw members 36. The heads 68 (as shown in FIG. 3) radiate toward one another forming a small diameter circle at their face ends. Thus, as a tool is positioned into the chuck 30, it contacts the heads 68 which balance the tool within the chuck 30. The centering mechanism 60, especially the projecting members 64, are manufactured from Mylar, Nitanol, spring steel or the like. Thus, when a small diameter tool is positioned into the chuck 30, the heads 68 encircle the tool. The heads 68 are rigid enough to hold the tool in position in the center of the chuck bore 38. However, if a larger diameter tool is inserted into the chuck bore 38, the projecting member 64 deflects at the neck 66 into the chuck bore 38. While the heads 68 still contact the tool, they are resilient enough to enable the tool to push the projecting members 64 into the chuck bore 38. After the large diameter tool is removed, the projecting members 64 springs backed to their original position ready to receive the next tool. The heads 68 may have a trapezoidal shape with their free end having a curved surface. This provides for better receipt of the tools. Also, the heads 68 are positioned between adjacent jaw members 36 forming a jaw member, projecting member repeating pattern.

In the event the jaw members 36 are in a fully retracted position and a small diameter tool or bit is positioned in the chuck 30, the tool or bit may fall between adjacent projecting members 64. In this case, as the chuck 36 is rotated to clamp the tool or bit, the tool or bit is contacted by the jaw member 36 positioned inbetween the adjacent projecting members 64. Thus, as the chuck 30 continues to rotate, in turn, closing the jaw members 36 around the tool or bit, the sides of the heads 68 and jaw member 36 direct the tool or bit into a centering position.

A protective cap 70 covers the end of the chuck 30. The cap 70 helps to retain the centering mechanism 60 in position on the chuck and in the body member bore 38.

The jaw members 36 include tips 74. The jaw tips 74 have contacting surfaces 76 and 78. The contacting surfaces 76 and 78 are angled with respect to one another such that they intersect one another and form an obtuse angle. The obtuse angle has a measurement of about 135°. Thus, as the jaw members 36 move towards one another into a clamping position, the extremities of the contacting faces 76 and 78 do not frictionally abut one another but are angled with respect to one another so that a small acute angle is formed between adjacent jaw members 36. Thus, as the jaw members 36 are continued to be rotated and move inwardly into the chuck body bore 38, the adjacent jaw members 36, due to the acute angles, force tool bits that may be trapped between adjacent jam members 36, toward the center or apex 80 of the jaw members 36. Thus, the acute angle helps to center the tool bit within the jaw members 36.

Figure 4:
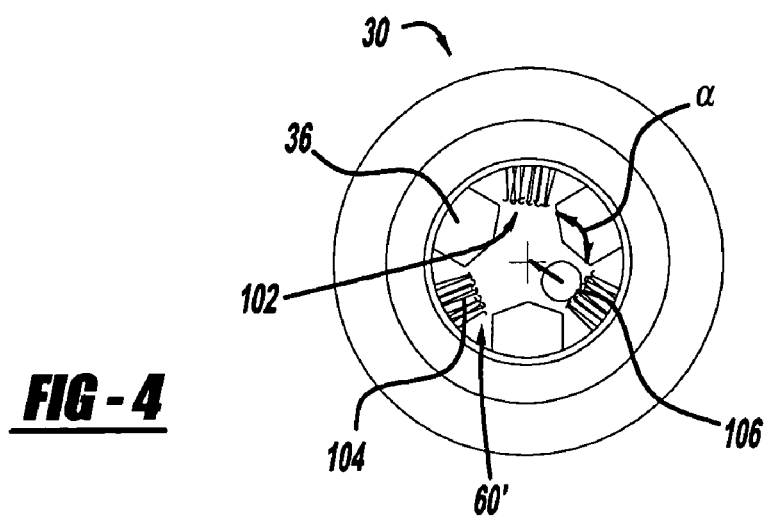
FIG. 4 is a plan view of a second embodiment of the present invention.

Turning to FIG. 4, an additional embodiment of the present invention is shown. Here, the chuck is the same as that shown. However, the centering mechanism 60' is different. Here, the centering mechanism 60' includes a plurality of members 102 which include an adhesive strip 104 and resilient hoop or loops 106. The members 102 is similar to one of the two portions of a Velcro™ strip. Thus, as the tool bit is positioned into the chuck, the hooks or loops 106 force the tool bit into the center of the chuck bore. Also, due to the resilience and rigidity, the hooks and loops enable smaller bits to be retained and positioned while collapsing when larger tools bits are used. However, when the larger tool bits are removed, the members 106 return back to their original position.

Figure 5:
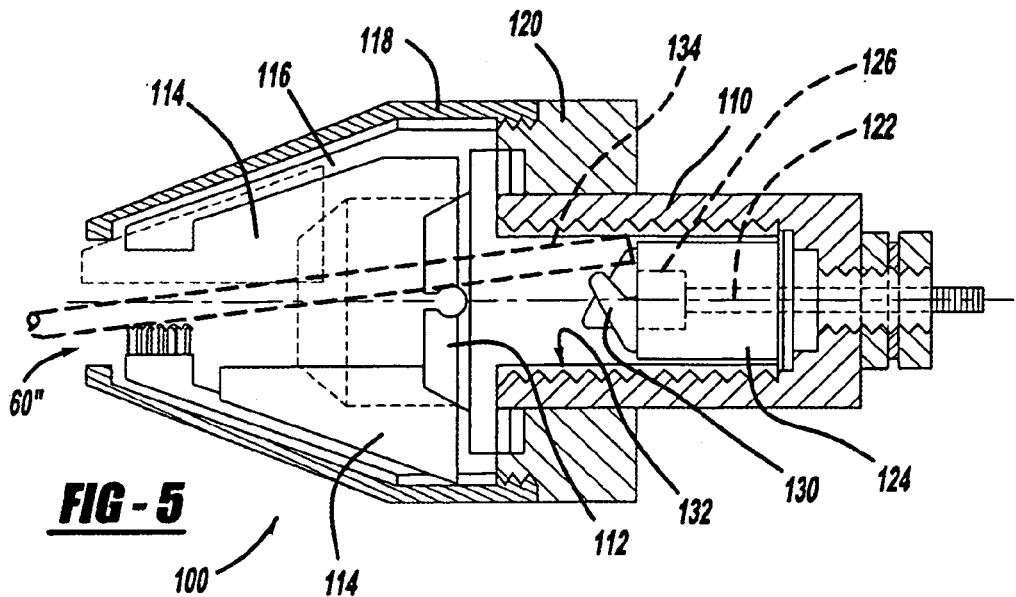
FIG. 5 is a cross-section view of a pusher chuck in accordance with the present invention.
Figure 6:
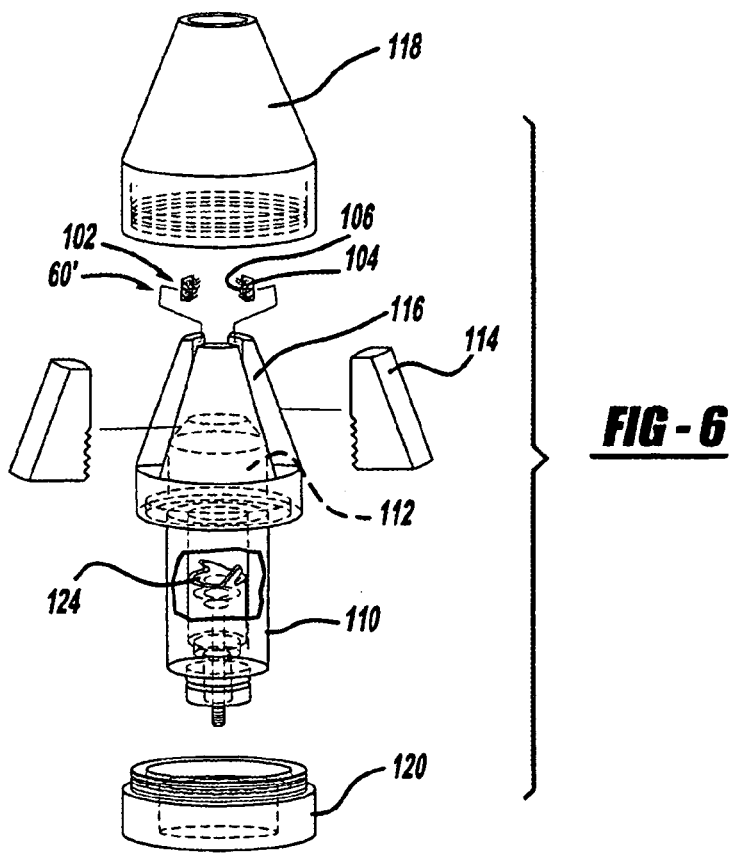
FIG. 6 is an exploded view of FIG. 5.

Turning to FIGS. 5 and 6, an additional embodiment is shown. Here, a pusher chuck 100 is shown. The pusher chuck 100 includes a chuck body 110 with a rotatable floating collar or nut 112 secured in the bore of the body 110. The nut 112 includes a plurality of jaws 114 which are positioned within a nose piece 116. Also, the pusher chuck 100 includes a handle ring 118 and a gripping ring 120 to enable tightening of the chuck. The pusher chuck 100 is retained onto the output by a fastener 122. The fastener is positioned within a spacer 124.

The spacer 124 includes a through bore with a countersink 126 to enable the screw 122 to pass into the spacer 124. The spacer 124 also includes at least one, preferably a plurality of wiper arms or ribs 130 The wiper arms or ribs 130 extend from the spacer axially into the body bore 132. The wiper arms or ribs 130 may follow a helical path so that they extend from the periphery of the spacer towards the center of the spacer 124.

As a tool is positioned into the pusher chuck 100, the rear end 134 of the tool contacts the spacer 124. As the output 20 is rotated, the spacer 124 is likewise rotated. The wipers or ribs 130 are rotated to contact the tool end 134. As this occurs, the helical pattern of the wipers or ribs 130 force the tool toward the center of the spacer 124. Thus, centering the inserted end 134 of the tool in the bore of the chuck body 110. Thus, the wiper arms or ribs 130 enable the inserted end 134 of the tool to be centered in the chuck body bore and the centering mechanism 60' centers the tool at the end of the chuck 100. Thus, a dual centering function is accomplished by the spacer 124 and the centering mechanism 60'. Also, the centering mechanism 60 previously described could be substitute for the centering mechanism 60' illustrated in the figures.

The present invention enables the user to place a tool bit into a chuck without the need for holding the tool bit while the chuck is tightened around the tool bit. Thus, the self centering mechanism of the present invention eliminates the need to hold the tool bit while enabling the user, in some instances, to use one hand to tighten the tool bit within the chuck.

In light of the above detailed description, those skilled in the art will appreciate that variations, modifications or alteration may occur without deviating from the scope and spirit of the present invention.

What is claimed is:

1. A chuck for a drill comprising:
   a body member having a wall defining a bore for receiving a tool to be retained in said chuck;
   jaw members received in said body member, said jaw members for frictionally engaging the tool to be retained in said chuck;
   a mechanism for opening and closing said jaw members, said mechanism associated with said jaw members and body member for moving said jaw members between clamping and non-clamping positions; and
   a centering mechanism extending radially into said body member bore, said centering mechanism including a plurality of discontinuous discrete projecting members and a plurality of openings positioned between adjacent discrete projecting members, each said discrete projecting member positioned only between adjacent jaw members to occupy a gap between adjacent jaw members and said jaw members occupying said openings between said adjacent discrete projecting members, and said discrete projecting members prohibiting the tool from contacting said body member wall enabling said jaw members to contact and clamp the tool.

2. The chuck according to claim 1, wherein said centering mechanism is manufactured from a resilient material enabling said mechanism to bend in said bore and return to its original position.

3. The chuck according to claim 1, wherein each projecting member includes a neck secured to said body near said wall and a head adjacent said jaw members.

4. The chuck according to claim 1, wherein each projecting member includes an adhesive strip for securing to said wall and a plurality of hook or loop members on said strip.

5. The chuck according to claim 1, wherein each jaw has a pair of tool contacting faces, said faces form an obtuse angle with a measurement of about 135°.

6. A power tool comprising:
   a housing;
   a motor in said housing;
   an output coupled with said motor;
   a power source;
   an activation member coupled with said power source and said motor for activating said motor driving said output;
   a chuck coupled with said output, said chuck comprising:
      a body member having a wall defining a bore for receiving a tool to be retained in said chuck;
      jaw members received in said body member, said jaw members for frictionally engaging the tool to be retained in said chuck;
      a mechanism for expanding and contracting said jaw members, said mechanism associated with said jaw members and body member for moving said jaw members between clamping and non-clamping position; and
      a centering mechanism extending radially into said body member bore, said centering mechanism including a plurality of discontinuous discrete projecting members and a plurality of openings positioned between adjacent discrete projecting members, each said discrete projecting member positioned inbetween only between adjacent jaw members to occupy a gap between adjacent jaw members and said jaw members occupying said openings between said adjacent discrete projecting members, and said discrete projecting members prohibiting the tool from contacting said body member wall enabling said jaw members to contact and clamp the tool.

7. The power tool according to claim 6, wherein said centering mechanism is manufactured from a resilient material enabling said mechanism to bend in said bore and return to its original position.

8. The power tool according to claim 6, wherein each projecting member includes a neck secured to said body near said wall and a head adjacent said jaw members.

9. The power tool according to claim 6, wherein each projecting member includes an adhesive strip for securing to said wall and a plurality of hook or loop members on said strip.

10. The power tool according to claim 6, wherein each jaw has a pair of tool contacting faces, said faces form an obtuse angle with a measurement of about 135°.

11. A chuck comprising:
    a body member having a wall defining a bore for receiving a tool to be retained in said chuck;
    jaw members received in said body member, said jaw members for frictionally engaging the tool to be retained in said chuck;
    a mechanism for opening and closing said jaw members, said mechanism associated with said jaw members and body member for moving said jaw members between clamping and non-clamping positions; and
    a plurality of discrete centering members, each centering member positioned only between adjacent jaw members occupying a gap between adjacent jaw members, each centering member being made of a material rigid enough to support small tools and prohibiting the small tools from deflecting said centering member so that said centering members enables said jaw members to clamp the small tools without the small tools becoming wedged between adjacent jaw members and said centering members being resilient enough to easily deflect when large tools are positioned in said bore which have a diameter larger than a diameter defined between ends of said plurality of centering members and upon removal of the large tools said plurality of centering members return to their original position.

12. The chuck according to claim 11, wherein said plurality of centering members have a neck and a head such that the heads extend toward one another.

13. The chuck according to claim 12, wherein said plurality of centering members are manufactured from Mylar, nitinol, or spring steel.

14. A chuck for a drill comprising:
a body member having a wall defining a bore for receiving a tool to be retained in said chuck;
jaw members received in said body members, said jaw member for frictionally engaging the tool to be retained in said chuck;
a mechanism for opening and closing said jaw members, said mechanism associated with said jaw members and body member for moving said jaw members between clamping and non-clamping positions;
a centering mechanism extending radially into said body member bore, said centering mechanism prohibiting the tool from contacting said body member wall enabling said jaw members to contact and clamp the tool; and
a rotatable spacer in said bore having at least one rib for centering the tool during rotation when the tool contacts said spacer.

15. A power tool comprising:
a housing;
a motor in said housing;
an output coupled with said motor;
a power source;
an activation member coupled with said power source and said motor for activating said motor driving said output;
a chuck coupled with said output, said chuck comprising:
a body member having a wall defining a bore for receiving a tool to be retained in said chuck;
jaw members received in said body members, said jaw member for frictionally engaging the tool to be retained in said chuck;
a mechanism for expanding and contracting said jaw members, said mechanism associated with said jaw members and body member for moving said jaw members between clamping and non-clamping position;
a centering mechanism extending radially into said body member bore, said centering mechanism prohibiting the tool from contacting said body member wall enabling said jaw members to contact and clamp the tool; and
a rotatable spacer in said bore having at least one rib for centering the tool during rotation when the tool contacts said spacer.

* * * * *

UNITED STATES PATENT AND TRADEMARK OFFICE
CERTIFICATE OF CORRECTION

PATENT NO. : 7,243,923 B2  Page 1 of 1
APPLICATION NO. : 11/055362
DATED : July 17, 2007
INVENTOR(S) : David C. Campbell et al.

It is certified that error appears in the above-identified patent and that said Letters Patent is hereby corrected as shown below:

Column 6,
Line 32, delete "inbetween".

Signed and Sealed this

Twenty-ninth Day of July, 2008

JON W. DUDAS
*Director of the United States Patent and Trademark Office*